(12) United States Patent
Jeong et al.

(10) Patent No.: US 10,051,496 B2
(45) Date of Patent: *Aug. 14, 2018

(54) METHOD AND APPARATUS FOR EFFICIENTLY REPORTING A CQI/CSI MEASUREMENT REPORT

(71) Applicant: Samsung Electronics Co., Ltd., Suwon-si, Gyeonggi-do (KR)

(72) Inventors: Kyeong In Jeong, Suwon-si (KR); Sang bum Kim, Seoul (KR); Gert-Jan Van Lieshout, Middlesex (GB); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,643

(22) Filed: Jun. 9, 2017

(65) Prior Publication Data

US 2017/0280339 A1    Sep. 28, 2017

Related U.S. Application Data

(63) Continuation of application No. 15/012,212, filed on Feb. 1, 2016, now Pat. No. 9,681,315, which is a (Continued)

(51) Int. Cl.
*H04W 24/10* (2009.01)
*H04W 24/02* (2009.01)
(Continued)

(52) U.S. Cl.
CPC ........... *H04W 24/02* (2013.01); *H04L 1/0026* (2013.01); *H04L 5/0048* (2013.01);
(Continued)

(58) Field of Classification Search
CPC ........................... H04W 72/042; H04W 24/02
See application file for complete search history.

(56) References Cited

U.S. PATENT DOCUMENTS

| 9,253,659 B2 | 2/2016 | Jeong et al. |
| 2008/0287068 A1 | 11/2008 | Etemad |

(Continued)

FOREIGN PATENT DOCUMENTS

| CN | 101841844 A | 9/2010 |
| CN | 101932070 A | 12/2010 |

(Continued)

OTHER PUBLICATIONS

Alcatel-Lucent Shanghai Bell, et al., "Specification Considerations on Restricted CSI Measurement", 3GPP TSG-RAN WG1 Meeting #63, R1-106000, Nov. 15-19, 2010.

(Continued)

*Primary Examiner* — Tuan H Nguyen
(74) *Attorney, Agent, or Firm* — Jefferson IP Law, LLP

(57) ABSTRACT

To solve the above-mentioned problem, a method in which a terminal reports channel state information comprises the following steps: receiving, plurality from a base station, information on a plurality of patterns to be used in a channel state measurement; receiving, from the base station, selection information for selecting a pattern from among the plurality of patterns that is to be used in the channel state information to be reported to the base station; measuring a channel state using the information on the plurality of patterns; and selecting a portion of the measured channel state based on the selection information, and reporting the selected portion to the base station. The above-described solution enables the efficient reporting of channel state information including CQI/CSI, thus improving communication efficiency.

16 Claims, 14 Drawing Sheets

Related U.S. Application Data continuation of application No. 13/978,491, filed as application No. PCT/KR2012/000284 on Jan. 11, 2012, now Pat. No. 9,253,659.

(60) Provisional application No. 61/431,635, filed on Jan. 11, 2011.

(51) Int. Cl.
| | |
|---|---|
| *H04L 5/00* | (2006.01) |
| *H04W 72/04* | (2009.01) |
| *H04W 52/36* | (2009.01) |
| *H04L 1/00* | (2006.01) |
| *H04W 52/38* | (2009.01) |
| *H04W 52/14* | (2009.01) |

(52) U.S. Cl.
CPC .......... *H04L 5/0057* (2013.01); *H04L 5/0073* (2013.01); *H04W 24/10* (2013.01); *H04W 52/365* (2013.01); *H04W 72/042* (2013.01); *H04L 1/0027* (2013.01); *H04W 52/146* (2013.01); *H04W 52/38* (2013.01); *Y02B 60/50* (2013.01); *Y02D 70/00* (2018.01)

(56) References Cited

U.S. PATENT DOCUMENTS

| | | | |
|---|---|---|---|
| 2009/0257387 | A1 | 10/2009 | Gholmieh et al. |
| 2010/0118720 | A1 | 5/2010 | Gauvreau et al. |
| 2010/0158147 | A1 | 6/2010 | Zhang et al. |
| 2010/0197339 | A1 | 8/2010 | Pedersen et al. |
| 2010/0202311 | A1 | 8/2010 | Lunttila et al. |
| 2010/0232385 | A1 | 9/2010 | Hsu |
| 2010/0273515 | A1 | 10/2010 | Fabien et al. |
| 2011/0116467 | A1 | 5/2011 | Jung et al. |
| 2011/0292851 | A1 | 12/2011 | Fong et al. |
| 2011/0317652 | A1 | 12/2011 | Kim et al. |
| 2012/0093103 | A1 | 4/2012 | Lee et al. |

FOREIGN PATENT DOCUMENTS

| | | | |
|---|---|---|---|
| EP | 2 230 875 | A2 | 9/2010 |
| KR | 10-2010-0009493 | A | 1/2010 |
| KR | 10-2010-0100644 | A | 9/2010 |
| KR | 10-2010-0112524 | A | 10/2010 |
| KR | 10-2010-0133917 | A | 12/2010 |
| WO | 2010/051514 | A1 | 5/2010 |
| WO | 2010/107907 | A2 | 9/2010 |
| WO | 2010/147956 | A2 | 12/2010 |
| WO | 2011/063244 | A2 | 5/2011 |

OTHER PUBLICATIONS

LG Electronics, "Details of eICIC in Macro-Pico case", 3GPP TSG-RAN WG1 Meeting #63, R1-106143, Nov. 15-19, 2010.
Texas Instruments, "CSI measurements on restricted subframes", 3GPP TSG-RAN WG1 Meeting #63, R1-105902, Nov. 15-19, 2010.
Mediatek Inc., "Discussion of Restricted CSI Measurements in Macro-Pico", 3GPP TSG-RAN WG1 Meeting #63, R1-106008, Nov. 15-19, 2010.
Alcatel-Lucent, "Corrections on PHR/PCMAX, c and activation/decativation", 3GPP TSG-RAN WG2 Meeting #72bis R2-110140, Jan. 10, 2011, www.3gpp.org/ftp/tsg_ran/WG2_RL2/TSGR2_72bis/Docs/R2-110140.zip.
Samsung, Discussion on Scell activation/dectication and CQI reporting [online], GPP TSG-RAN WG2 Meeting #72bis, R2-110149, Jan. 11, 2011, www.3gpp.org/ftp/tsg_ran/WG2_RL2/TSGR2_72bis/Docs/R2-110149.zip.
RAN2: "LS on Timing Requirements for Activation and Deactivation of SCells", 3GPP Draft; R1-105829 (R2-106016), 3rd Generation Partnership Project (3GPP), XP050466685, Nov. 9, 2010.
Alcatel-Lucent et al: "Implementation of timing Requirements for Activation and Deactivation of SCells in RAN1 specification", 3GPP Draft; R1-106218_FINAL, 3rd Generation Partnership Project (3GPP), XP050489658, Nov. 9, 2010.
Samsung: "SCell activation and CQI reporting", 3GPP Draft; R2-106507 Scell Activation and CQI Reporting, 3rd Generation Partnership Project (3GPP), XP050492306, Nov. 9, 2010.
"CATT: Definition of Pcmax in CA", 3GPP Draft; R4-104357, 3rd GeneratiOn Partnership PrOject (3GPP), MObile Competence Centre ; 650, Route Des LuciOles ; F-06921 S0phia-Antip0lis Cedex ; France, vol. RAN WG4, No. Jacksonville; Nov. 15, 2010, Nov. 9, 2010 (Nov. 9, 2010), XP050499529, [retrieved on Nov. 9, 2010] p. 1, line 11, paragraph 2—p. 2, line 14 p. 2, paragraph 6.2.5 p. 4, paragraph 6.2.5A.
"Etsi: Radio Access (E-UTRA); Medium Access Control (MAC) protocol specification", 3GPP TS36.321 V9.3.0, Jun. 1, 2010 (Jun. 1, 2010), XP055121209, Retrieved from the Internet: URL:http://www.etsi.org/deliver/etsi_ts/136300_136399/136321/09.03.00_60/ts_136321v0 90300p.pdf [retrieved on Jun. 3, 2014] paragraph [5.4.4].
Alcatel-Lucent Shanghai Bell et al: "Specification Considerations on Restricted CSI Measurement", 3GPP Draft; R1-106000 SpecificatiOn COnsideratiOns Related t0 ABS 0n Restricted CSI Measurement_Final, 3rd GeneratiOn Partnership PrOject (3GPP), MObile COmpetence Centre ; 650, R0ute Des LuciOles ; F-06921 S0phia-Antip0lis Cedex ; France, vol. RAN WGI, No. Jacksonville, USA; Nov. 15, 2010, Nov. 9, 2010 (Nov. 9, 2010), XP050489503, [retrieved on Nov. 9, 2010] paragraph [0002].
Ericsson (RAN2): "LS on Timing 1-10 Requirements for Activation and Deactivation of SCells", 3GPP Draft; R2-105961 LS on Timing Requirements for Activation and Deactivation of Scells, 3rd Generation Partnership Project (3GPP), Mobile Competence Centre ; 650, Route Des Lucioles ; F-06921 Sophia-Antipolis Cedex ; France, vol. RAN WG2, No. Xi 'an; Oct. 11, 2010-Oct. 2010, Oct. 15, 2010 (Oct. 15, 2010), XP050605479, V [retrieved on Oct. 15, 2010] section 1.
Nokia Siemens Networks et al: "Timing and 1-10 HARQ Feedback Errors with Activation/Deactivation", 3GPP Draft; R2-101986 MAC Activation Dactivation, 3rd Generation Partnership Project (3GPP), Mobile Competence Centre ; 650, Route Des Lucioles ; F-06921 Sophia-Antipolis Cedex ; France, vol. RAN WG2, No. Beijing, china; Apr. 12, 2010, Apr. 6, 2010 (Apr. 6, 2010), XP050422521, ./ [retrieved on Apr. 6, 2010] figure 1 section 2.
Huawei et al: "Triggering and 1-10 transmission of aperiodic Csi reports", 3GPP Draft; RI-105128, 3rd Generation Partnership Project (3GPP), Mobile Competence Centre ; 650, Route Des Lucioles ; F-06921 Sophia-Antipolis Cedex ; France, vol. RAN WGI, No. Xi 'an; Oct. 11, 2010, I Oct. 5, 2010 (Ocr. 5, 2010), XP050450349, [retrieved on Oct. 5, 2010] figure 1 section 2. 1.
LG Electronics; Aspect on Simultaneous Transmission of PRACH and UL Channels considering Multiple Timing Advance; 3GPP TSG RAN WG1 Meeting #67; R1-113910; Nov. 14-18, 2011; San Francisco, CA.
Alcatel-Lucent et al.; Simultaneous transmissions of RACH and PUCCH/PUSCH/SRS; TSG-RAN WG2#76; R2-116184; Nov. 14-18, 2011; San Francisco, CA.
Catt; Discussion on the Design of ABS Pattern and its Impact on the Measurement; 3GPP TSG RAN WG1 meeting #63; R1-105935; Nov. 15-19, 2010; Jacksonville, FL.
Qualcomm Incorporated; eICIC ABS Pattern Considerations; 3GPP TSG-RAN WG4 meeting #57; R4-104151; Nov. 15-19, 2010; Jacksonville, FL.
Alcatel-Lucent; ABS Pattern for CSI, RLM and RRM; 3GPP TSG RAN WG4 Meeting #57; R4-104258; Nov. 15-19, 2010; Jacksonville, FL.
Alcatel-Lucent; Signalling support for Almost Blank Subframe patterns; 3GPP TSG-RAN WG2 Meeting #72; R2-106449; Nov. 15-19, 2010; Jacksonville, FL.
LG Electronics; Remaining CA Issues for Cell Activation/Deactivation and CIF; 3GPP TSG RAN WG1 Meeting #63; R1-106107; Nov. 15-19, 2010; Jacksonville, FL.

METHOD AND APPARATUS FOR EFFICIENTLY REPORTING A CQI/CSI MEASUREMENT REPORT

CROSS-REFERENCE TO RELATED APPLICATION(S)

This application is a continuation application of prior application Ser. No. 15/012,212, filed on Feb. 1, 2016 and prior application Ser. No. 13/978,491, filed on Jul. 5, 2013, which has issued as U.S. Pat. No. 9,253,659 on Feb. 2, 2016 and claimed the benefit under 35 U.S.C. § 371 of an International application filed on Jan. 11, 2012 and assigned application number PCT/KR2012/000284, which claimed the benefit of a U.S. provisional application filed on Jan. 11, 2011 in the U.S. Patent and Trademark Office and assigned Ser. No. 61/431,635, the entire disclosure of which is hereby incorporated by reference.

BACKGROUND OF THE INVENTION

Field of the Invention

The present invention relates to a method and apparatus for reporting CQI/CSI measurement information efficiently.

Description of the Related Art

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the $3^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

Recent studies are focused on the LTE-Advanced (LTE-A) for improving data rate with the adaptation of several new techniques to legacy LTE system. For such a leap in technology, Inter-Cell Interference Coordination (ICIC) is also evolving to enhanced ICIC (eICIC) or Time-domain ICIC. The eICIC/Time-domain ICIC is a technique to mitigate inter-cell interference to the victim cell by reducing transmit power in a cell causing interference or totally muting data transmission in unit of subframe.

The UE located in the victim cell can have an opportunity for channel measurement to maintain the radio link to the victim cell and transmit data only in the corresponding subframe. This subframe is referred to as Almost Blank Subframe (ABS) and appears in a predetermined pattern.

The ABSs are offered in various patterns, particularly, two ABS patterns for CQI/CSI measurement. These patterns are notified to the UE through RRC signal. The UE has to perform CQI/CSI report with one of these two patterns. There is therefore a need of a method for determining the pattern to be applied.

DISCLOSURE OF INVENTION

Technical Problem

The present invention provides a method for measuring and reporting channel information capable of selecting one of plural patterns for the UE to report CQI/CSI measurement efficiently in an evolved LTE system.

Solution to Problem

In order to solve the above problem, a channel state measurement information report method of a terminal includes receiving plural patterns for use in channel state measurement from a base station; receiving a selection information for selecting one of the patterns to be used in reporting channel state information; measuring the channel states using the plural patterns; and reporting the channel state selected among the measured channel states based on the selection information.

Advantageous Effects

The present invention is capable of reporting the channel state information including CQI/CSI efficiently, resulting in improvement of communication efficiency.

DETAILED DESCRIPTION OF EXEMPLARY EMBODIMENTS

Figure 1:
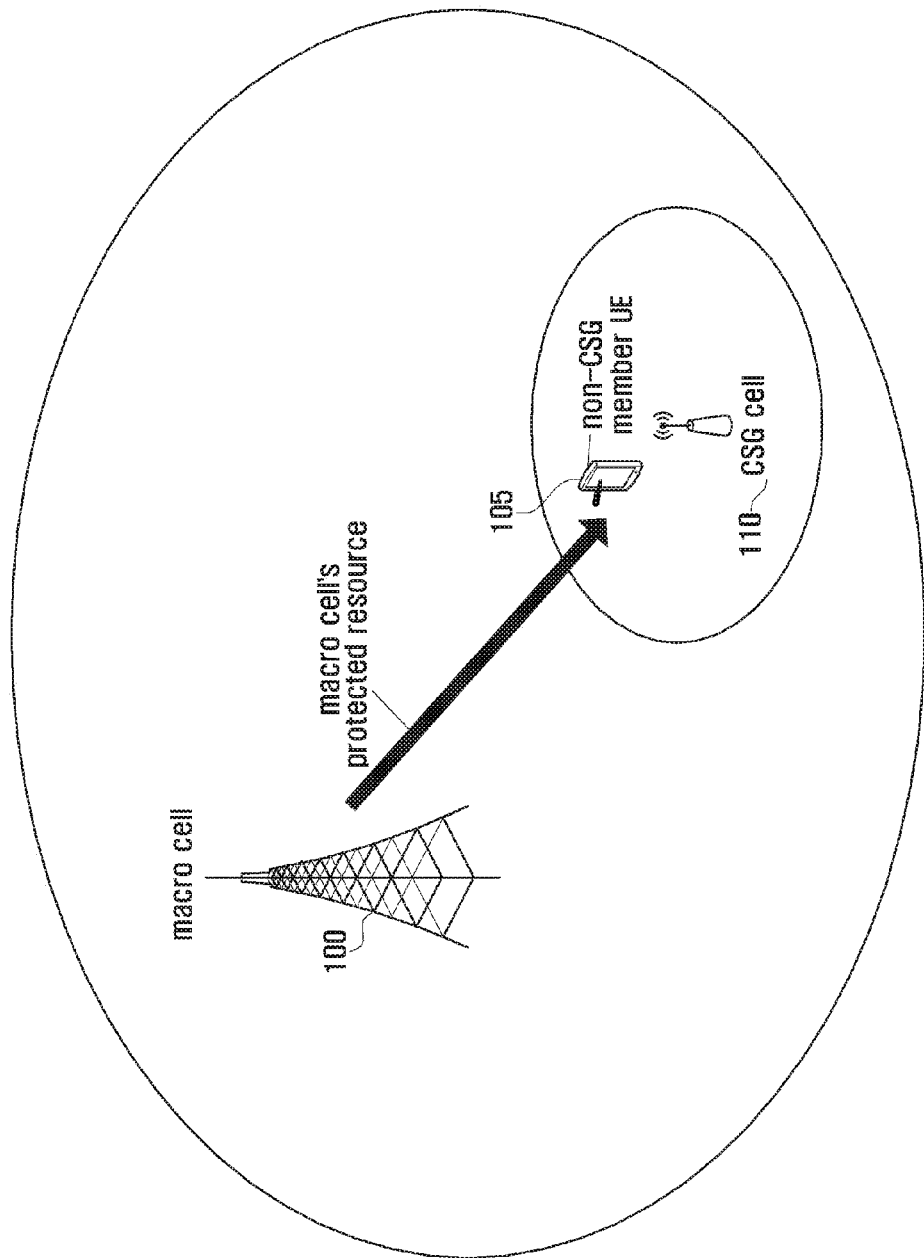
FIG. 1 is a diagram illustrating an interference scenario between a macro cell and a CSG cell.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Hereinafter, a description is made of the mobile terminal according to embodiments of the present invention with reference to the accompanying drawings.

The present invention relates to a method and apparatus for reporting CQI/CSI measurement information efficiently.

There are various types of cells in the LTE system. For example, a Closed Subscriber Group (CSG) cell serves a constrained set of UEs. The CSG cell is mainly directed to providing indoor service and has small service coverage. A pico cell has small service coverage and mainly deployed at a hot spot area with frequent traffic of data. These cells have relatively short radius service coverage as compared to the macro cell, and plural CSG cell and pico cells may be deployed in the service area of one macro cell. At this time, this may incur interference between the macro cell and CSG or pico cell.

FIG. 1 is a diagram illustrating an interference scenario between a macro cell and a CSG cell. Referring to FIG. 1, the UE 105 connects to the macro cell 10 to receive service. At this time, the UE moves to the service area of the CSG cell 110. If it is not a member of the CSG cell 110, the UE 105 is interfered significantly by the signal from the CSG cell. In this case, the CSG cell 110 becomes the aggressor cell, and the macro cell 100 becomes the victim cell.

Figure 2:
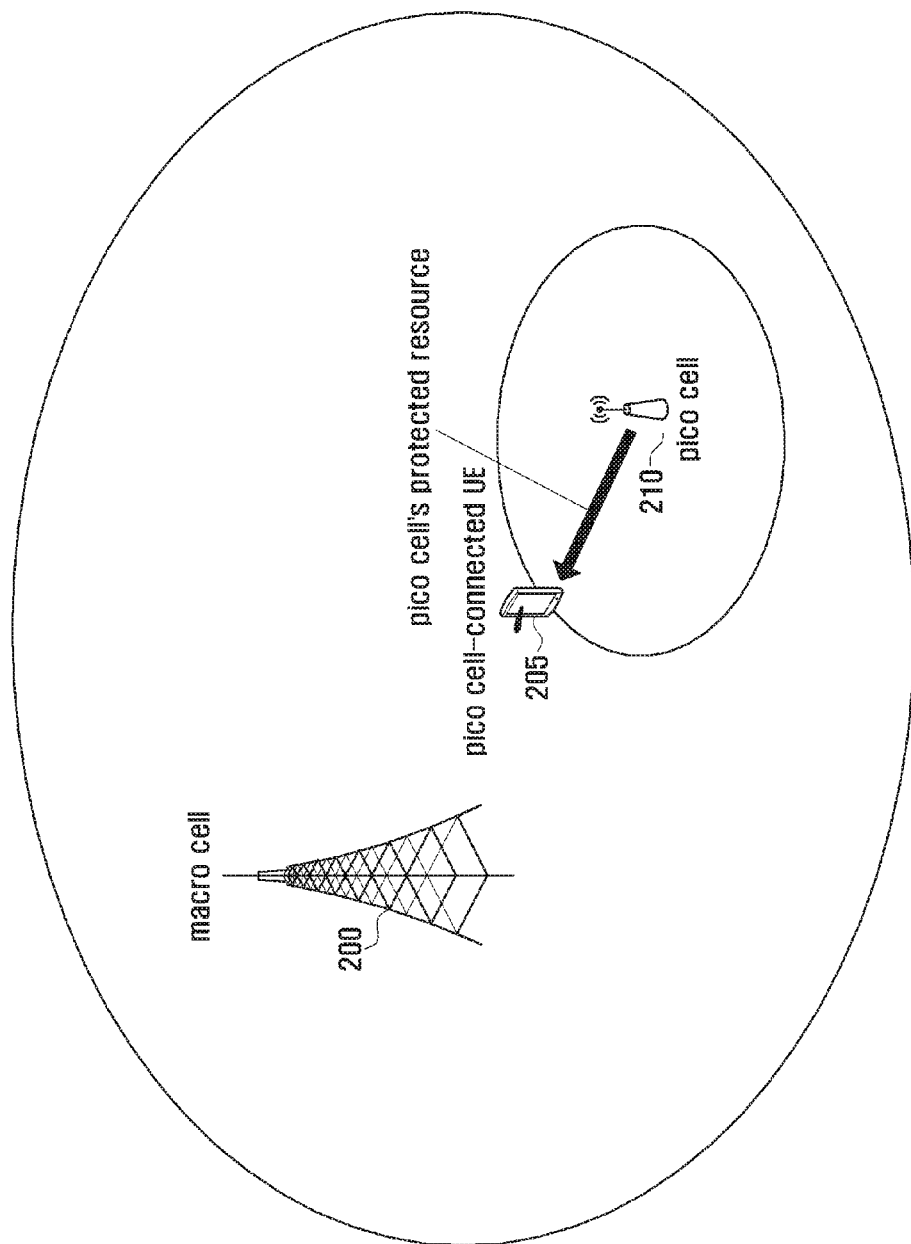
FIG. 2 is a diagram illustrating an interference scenario between a macro cell and a pico cell.

FIG. 2 is a diagram illustrating an interference scenario between a macro cell and a pico cell.

Referring to FIG. 2, the UE connects to the pico cell to receive service. The UE 205 moves in the direction from the pico cell 210 to the eNB of the macro cell 200. In this case, the UE 205 is interfered significantly by the signal from the macro cell. The interference from the macro cell may be cancelled by performing handover to the macro cell. However, the pico cell 210 may be required to serve more users for the sake of operation efficiency and, in this case, it is necessary for the users at the cell boundary to be served by the pico cell 210. In this case, the macro cell 200 becomes the aggressor cell, and the pico cell 201 the victim cell.

The eICIC is a technique to mitigate interference form the aggressor cell to the victim cell in these inter-cell interference scenarios. The aggressor cell decreases transmission power or mutes data transmission according to a predetermined pattern in unit of subframe so as to mitigate the interference to the victim cell. In contrast, the UE in the victim cell performs channel measurement in the corresponding subframe to maintain the radio link with the victim cell and be scheduled for data transmission. Such a subframe is referred to as Almost Blank Subframe and appears in a predetermined pattern.

Figure 3:
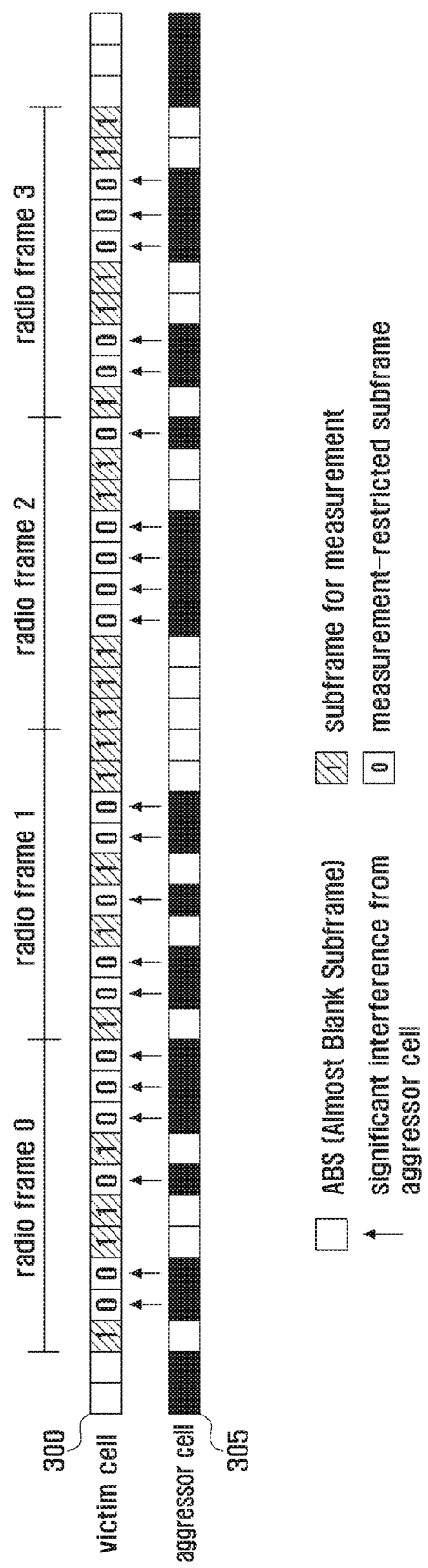
FIG. 3 is a diagram illustrating a pattern for use in the eICIC technique.

FIG. 3 is a diagram illustrating a pattern for use in the eICIC technique.

FIG. 3 shows the victim cell's consecutive subframe structure 300 and the aggressor cell's consecutive subframe structure 305. In the aggressor cell, the subframe with reduced transmission power or muted is referred to as ABS 310.

The other subframes can be used for data transmission based on the legacy power control. There is little or no interference to the victim cell in ABSs but may be significant interference to the victim cell in other cells 315.

For example, the victim cell restricts channel or CQI/CSI measurement according to the positions of the ABS subframes 310. The restricted subframes 320 and non-restricted subframes 325 are indicated by 0 and 1 in a pattern of subframes which the eNB notifies the UE through RRC signaling. The subframes indicated by 1 are ABSs 310 in which channel measurement or CQI/CSI measurement is not restricted. A 40-bit bitmap is used for FDD, and the bitmap size varies in TDD according to TDD configuration. In TDD, the bitmap size is 70 bits for TDD configuration 0, 20 bits for TDD configurations 1 to 5, and 60 bits for TDD configuration 6.

FIG. 3 is directed to the FDD case of using 40-bit bitmap corresponding to ABS information for 4 frames (40 ms), i.e. 40 subframes. This pattern information is applied repeatedly every 40 subframes. There may be the patterns of other purposes than aforementioned as follows.

Pattern 1: pattern for restricting measurement in serving cell

Pattern 2: pattern for restricting measurement in victim cell on the same frequency as the service cell Pattern 3: pattern for restricting CQI/CSI measurement in serving cell Particularly, pattern 3 for restricting CQI/CSI measurement is classified into one of two patterns for control efficiency. These two patterns may include non-ABS subframes and notified to the UE through RRC signaling.

Figure 4:
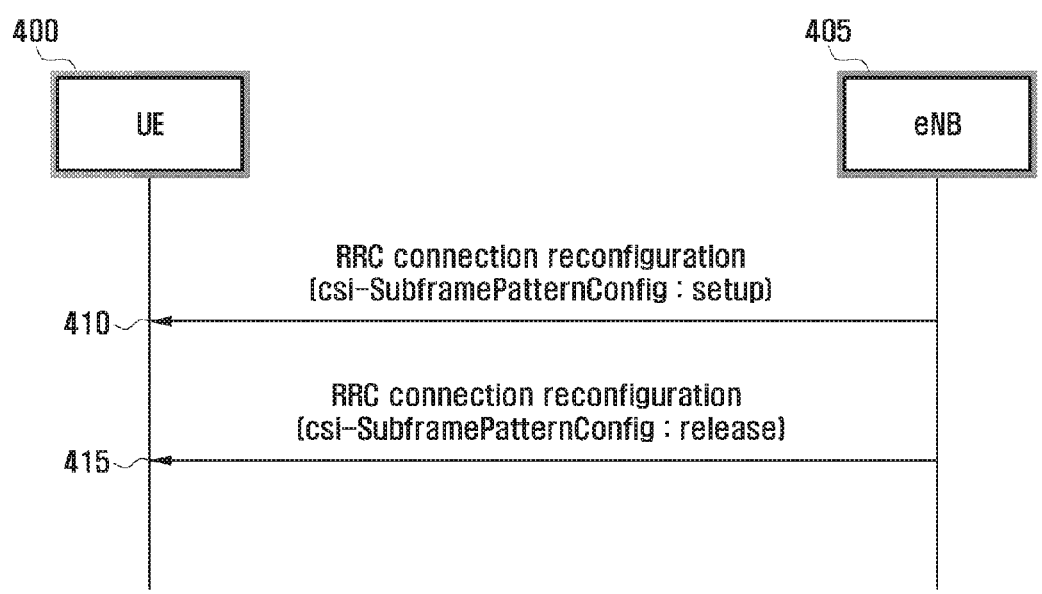
FIG. 4 is a diagram illustrating RRC signaling.

FIG. 4 is a diagram illustrating RRC signaling.

Referring to FIG. 4, the UE 400 receives RRC connection reconfiguration message including the pattern information for CQI/CSI measurement from the eNB 405 at step 410. If the csi-SubframePatternConfig IE of the RRC connection reconfiguration message includes the pattern information along with a setup instruction, CQI/CSI measurement is performed at the subframe of which corresponding bit is set to 1 in the pattern bitmap. If the RRC connection reconfiguration message including csi-SubframePatternConfig IE with a release instruction at step 415, the UE stops the ongoing eICIC.

If the information on the two patterns is received in RRC connection reconfiguration message, the UE performs CQI/CSI measurement per pattern independently. The uplink CQI/CSI report is performed periodically or non-periodically.

In the case of periodic CQI/CSI report, the measurement result acquired with one of the two patterns is selected. At this time, there is a need of selecting the pattern to be applied for measurement.

Embodiment 1

Though explicit signaling, it is indicated which pattern is used for CQI/CSI report in specific subframes. This signaling is made with a bitmap of which each bit indicates the pattern to be applied to the subframe. The first pattern is indicated by '0' while the second pattern is indicated by '1'. The size of the bitmap may be fixed or variable according to the FDD or TDD configuration. In the case of the bitmap variable in size, the bitmap is 40 bits for FDD; and 20, 60, or 70 bits depending on the TDD configuration. The subframe corresponding to each bit of the bitmap may be the subframe supporting CQI/CSI report or the subframe in which CQI/CSI request is received.

Figure 5:
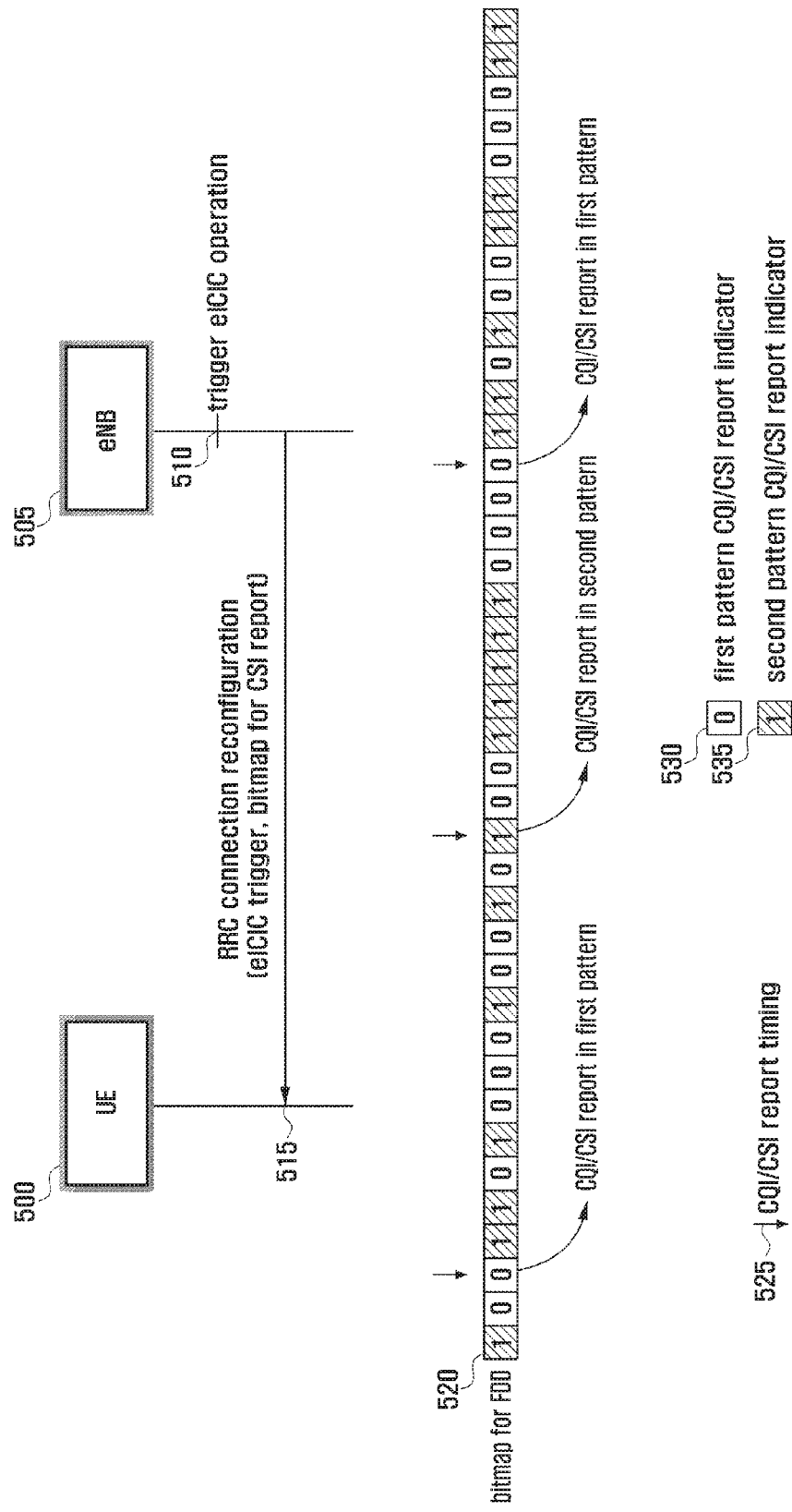
FIG. 5 is a diagram illustrating embodiment 1.

FIG. 5 is a diagram illustrating embodiment 1.

Referring to FIG. 5, the eNB 505 triggers the eICIC operation at step 510. The eNB 505 sends the UE 500 the information for use in CQI/CSI report along with the eICIC execution instruction through RRC signaling at step 515. The bitmap information 520 indicates the pattern to be applied at the CQI/CSI report timing 525.

The UE 500 compares the subframe for CQI/CSI report with the bitmap information and, applies the first pattern for the subframe set to 0 in the bitmap and the second pattern for the subframe set to 1 in the bit map. Depending on the embodiment, it is possible to interpret the information oppositely.

Embodiment 2

Independent CQI/CSI configurations for CQI/CSI measurement are provided for use with two distinct ABS patterns.

This means that there is one CQI/CSI configuration for use with the first pattern and another CQI/CSI configuration for use with the second pattern. Accordingly, the CQI/CSI informations acquired with distinct patterns are reported independently.

The two independent CQI/CSI configuration informations may include the information for use in determining the periodic report timings such as cqi-pmi-ConfigIndex and ri-ConfigIndex as well as the pattern information. Also, only the CQI/CSI configuration information can be provided independently.

In a certain subframe, both the two CQI/CSI configurations may be applied. In this case, it is required to select one of the two CQI/CSI reports. For example, the CQI/CSI configuration applying the first ABS pattern may instruct to report CQI/CSI information at an interval of every 2 ms while the other CQI/CSI configuration applying the second ABS pattern instructs to report CQI/CSI information at every 5 ms. If the start points are identical, the two CQI/CSI reporting timings collides at the time corresponding to the common multiples of 2 and 5 such as 10 ms and 20 ms and thus one of the two CQI/CSI reports has to be sent selectively.

In order to accomplish this, 1-bit indicator is used in this embodiment. The corresponding indicator indicates the pattern which is used for acquiring the CSI-RS information to be transmitted in the colliding subframe.

If the indicator is set to 0, this means the CQI/CSI report acquired using the first ABS pattern and, otherwise, if the indicator is set to 1, this means the CQI/CSI report acquired using the second ABS pattern.

The 1-bit indicator is transmitted through RRC signaling or provided in the CQI/CSI configuration. Instead of using the indicator, it is possible to indicate the pattern implicitly.

For example, it is possible to configured such that when two CQI/CSI report timings collide the CQI/CSI information acquired with the first or second ABS pattern is transmitted unconditionally.

Figure 6:
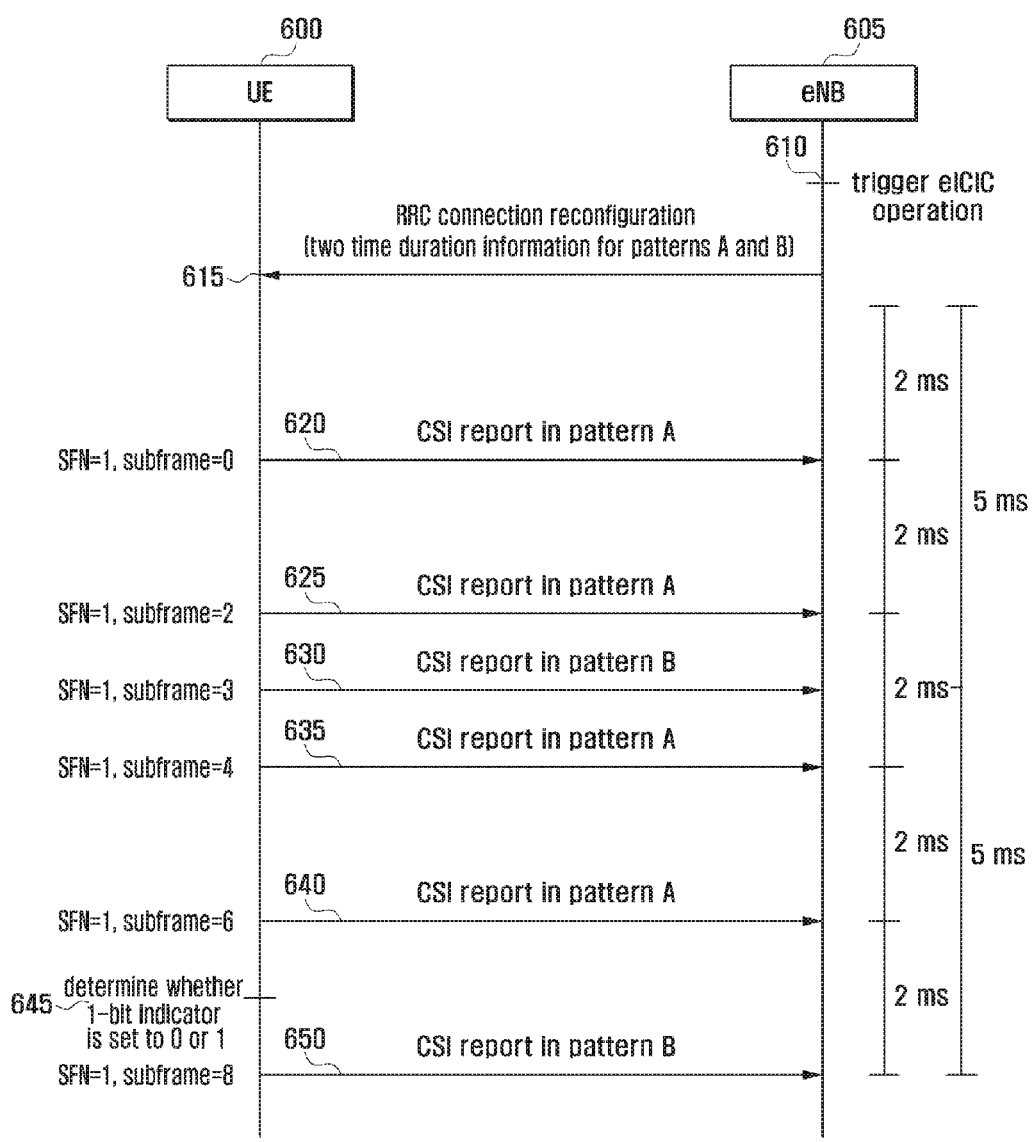
FIG. 6 is a message flow diagram illustrating embodiment 2.

FIG. 6 is a message flow diagram illustrating embodiment 2.

Referring to FIG. 6, the eNB 605 triggers the eICIC operation at step 610. The sends the UE 600 the CQI/CSI configuration information for CQI/CSI measurement and report with two patterns through RRC signaling at step 615.

For example, the CQI/CSI configuration information includes in time axis pattern information. As aforementioned, this indicator indicates the pattern to be used for CQI/CSI information report in the subframe where two CQI/CSI reports collide.

In this embodiment, the CQI/CSI reports with the two distinct patterns are performed at the respective periods of 2 ms and 5 ms. Through steps 620 to 640, the CQI/CSI reports with the respective patterns are performed without overlap. However, the CQI/CSI report timings of SFN=1 and subframe=8 become identical with each other. As described above, the UE is capable of determining the CQI/CSI information to be reported at the next report occasion based on the 1-bit indicator information at step 645. In embodiment 2, the second pattern B is selected such that the CQI/CSI report is performed with the corresponding pattern.

Figure 13:
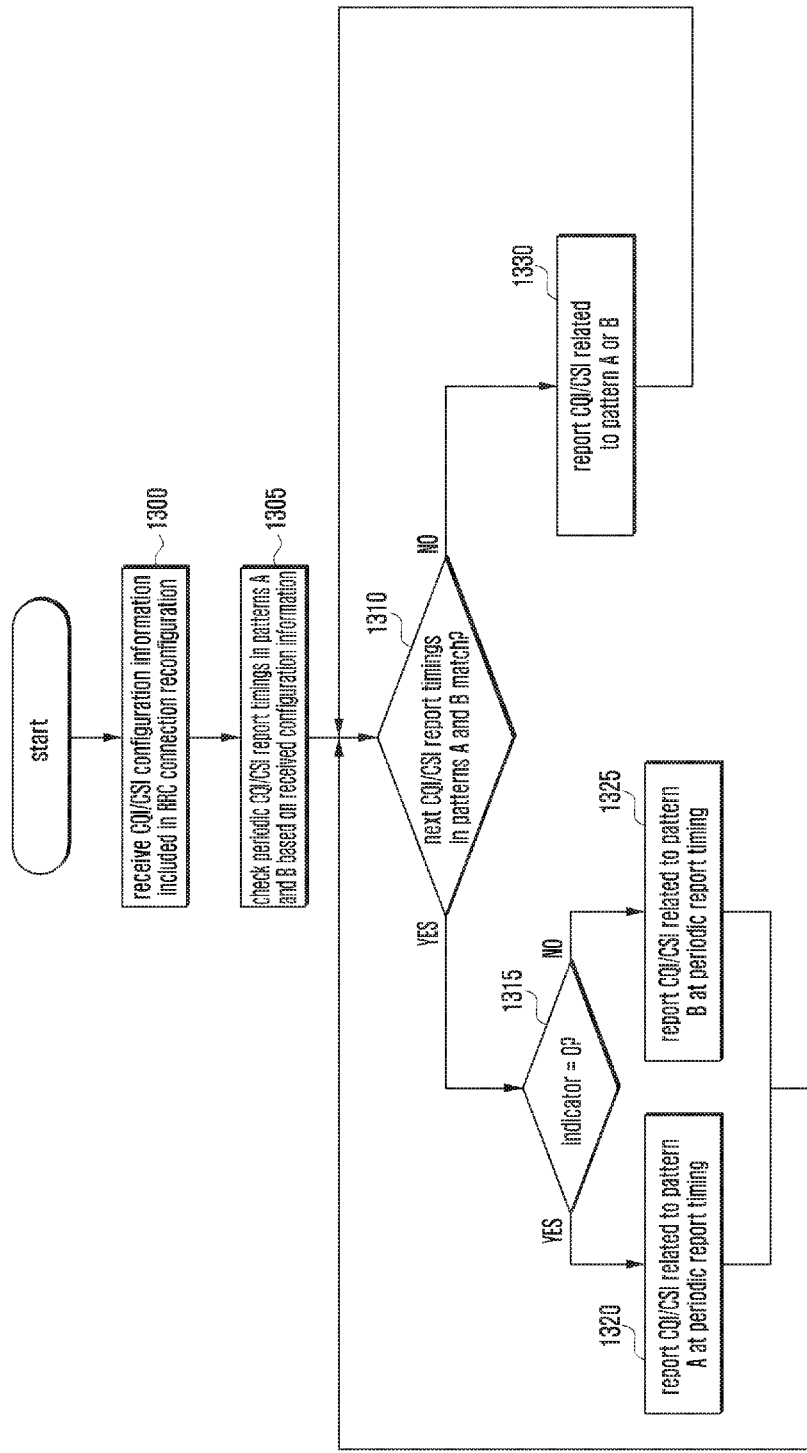
FIG. 13 is a flowchart illustrating UE operations in embodiment 2.

FIG. 13 is a flowchart illustrating UE operations in embodiment 2.

Referring to FIG. 13, the UE receives RRC connection reconfiguration including CQI/CSI configuration information at step 1300. The information includes two independent patterns informations.

The UE acquires periodic CQI/CSI report timings in the two patterns based on the corresponding configuration information at step 1305. The UE checks whether the next CQI/CSI report timings in the two patterns match each other at step 1310. If the timings match, the UE determines whether the indicator received from the eNB is set to 0 or 1 at step 1315.

If the indicator is set to 0, the UE reports the CQI/CSI information associated with the first pattern at step 1320. Otherwise, if the indicator is set to 1, the UE reports the CQI/CSI information associated with the second pattern to the eNB at step 1325.

If the CQI/CSI report timings mismatch, the UE reports the CQI/CSI information at the corresponding occasion of the pattern to the eNB at step 1330.

Figure 14:
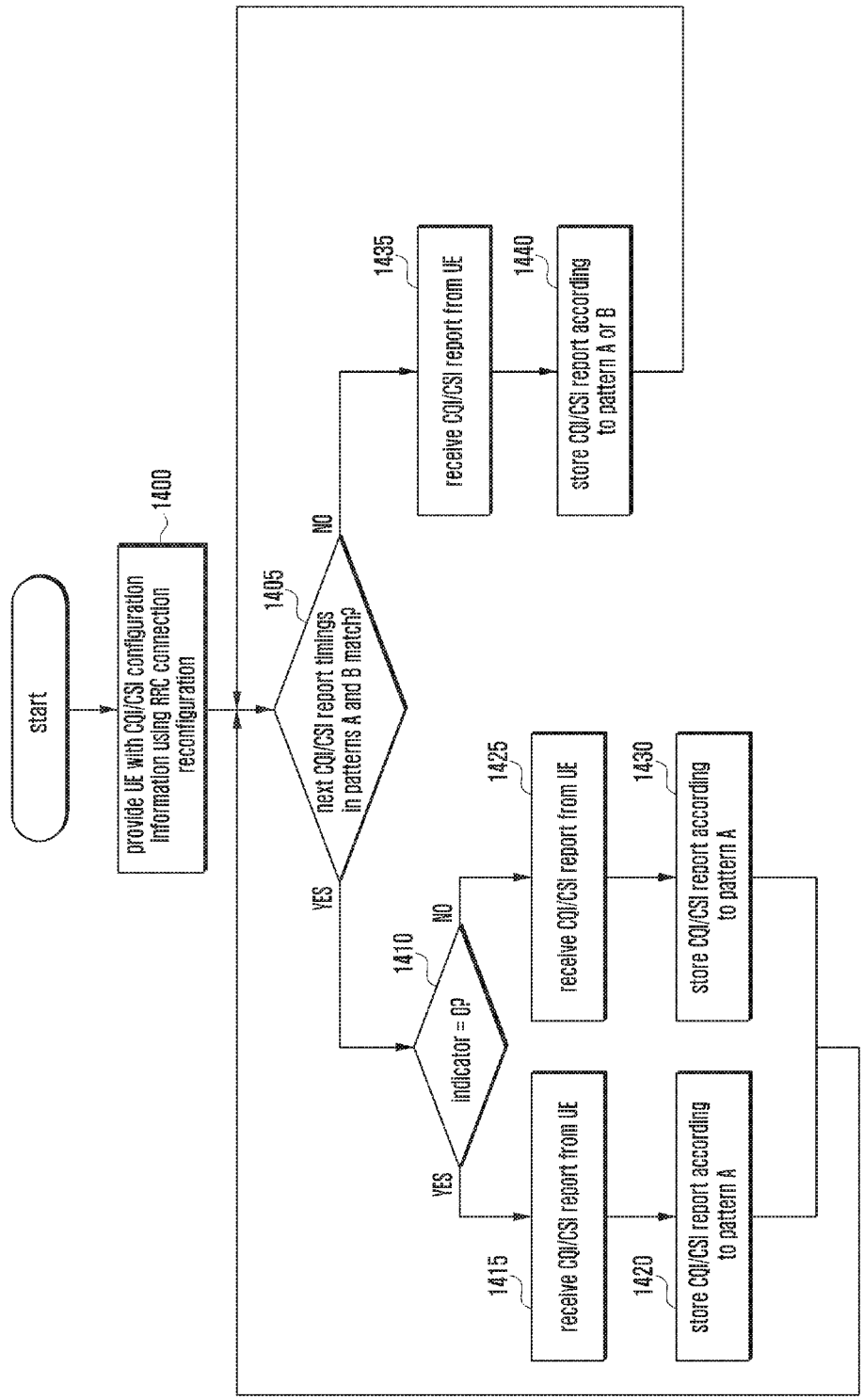
FIG. 14 is a flowchart illustrating eNB operations in embodiment 2.

FIG. 14 is a flowchart illustrating eNB operations in embodiment 2.

Referring to FIG. 14, the eNB provides the UE with two independent pattern configuration informations using the RRC connection reconfiguration message at step 1400. The eNB receives CQI/CSI information associated with the two patterns from the UE.

The eNB determines whether the report timings in the two patterns match each other at step 1405. If the report timings match, the eNB determines whether the indicator provided to the UE at step 1410 is set to 0 or 1.

If the indicator is set to 0, the UE receives the CQI/CSI information reported by the UE at step 1415 and stores the received information as the CQI/CSI information of the first pattern at step 1420.

If the indicator is set to 1, the eNB receives the CQI/CSI information reported by the UE at step 1425 and stores the received information as the CQI/CSI information of the second pattern.

If the report timings mismatch, the eNB receives the CQI/CSI information at step 1435 and stores the CQI/CSI information of the pattern having the corresponding report timing as the CQI/CSI information of first or second pattern at step 1440.

Embodiment 3

In embodiment 3, the CQI/CSI information associated with only one of the two ABS patterns can be reported.

In order to change the ABS pattern to be applied, a 1-bit indicator is transmitted through RRC signaling.

For example, the indicator is set to 0 to indicate CQI/CSI report with the application of the first ABS pattern and 1 to indicate CQI/CSI report with the application of the second ABS pattern.

Figure 7:
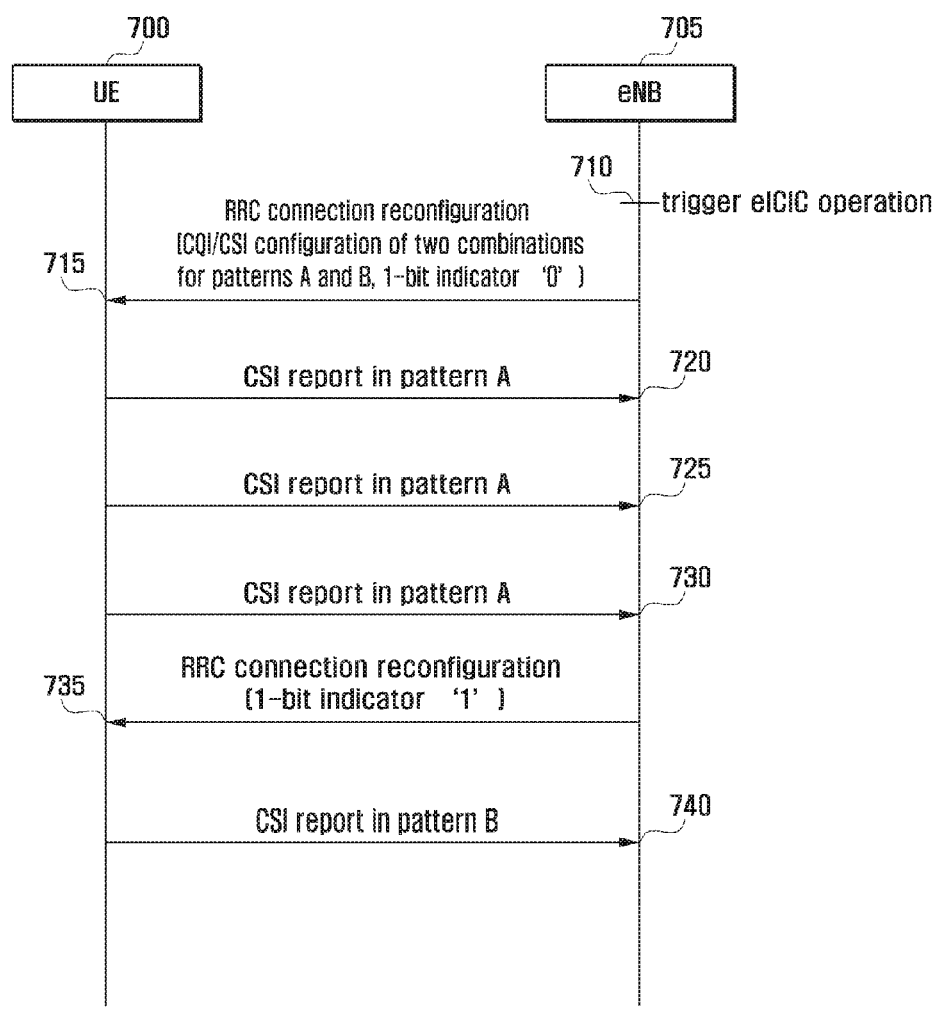
FIG. 7 is a signal flow diagram illustrating embodiment 3.

FIG. 7 is a signal flow diagram illustrating embodiment 3.

Referring to FIG. 7, the eNB 705 triggers the eICIC operation at step 710. The eNB 705 sends the UE 700 the CQI/CSI configurations associated with the two patterns through RRC signaling at step 715. The RRC signaling may include a 1-bit indicator additionally.

As described above, the 1-bit indicator indicates the pattern with which the CQI/CSI information is to be reported. The UE 700 sends the eNB 705 the CQI/CSI information of the pattern indicated by the 1-bit indicator. The UE 700 reports the CQI/CSI information of the pattern indicated by the corresponding bit at steps 720 to 730.

If it is required to change the pattern to be applied at the eNB 705, it is possible to change the pattern through RRC signaling at step 735. After receiving this, the UE 700 reports the CQI/CSI information of the changed pattern to the eNB 705 at step 740.

Embodiment 4

In this embodiment, the pattern to be applied for CQI report in a specific subframe is indicated by the scheduling information on CSI-RS (Reference Signal).

The CSI-RS scheduling information for use in CQI/CSI report is specified in TS36.213. The CQI/CSI information is acquired based on the CSI-RS transmitted in the subframe preceding the subframe used in reporting the CQI/CSI as many as a few subframes.

The CSI-RS is measured by UE and a set of subframes provided in a predetermined pattern used in acquiring the CSI information.

In the case of periodic CQI/CSI report, the CSI-RS transmitted at the most recent subframe among the subframes preceding four subframes before is used.

In the case of non-periodic CQI/CSI report, the CSI-RS transmitted four subframes before in FDD while it is variable in TDD depending on the TDD configuration.

Figure 8:
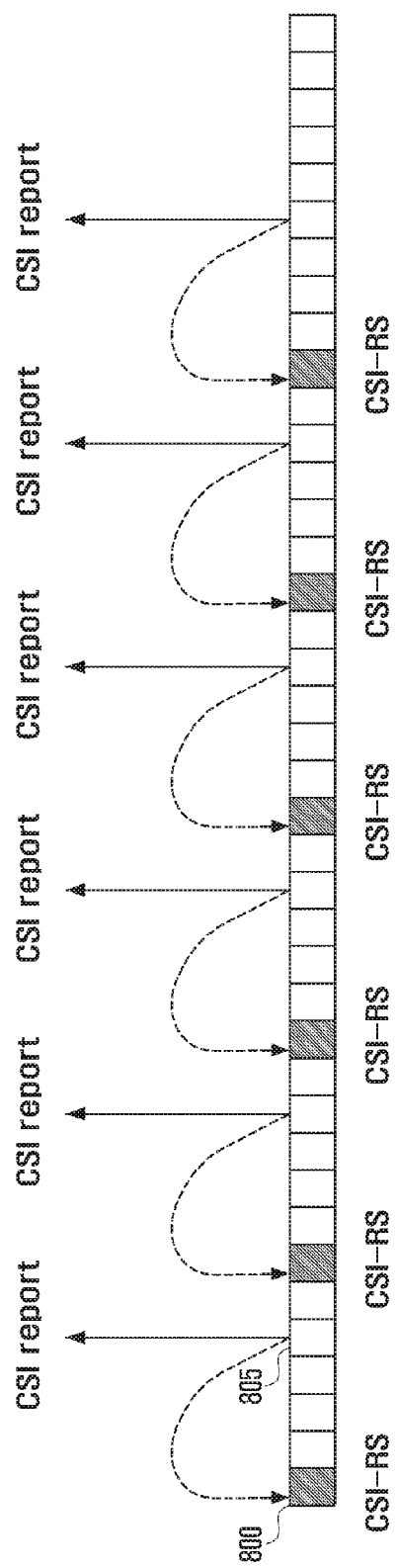
FIG. 8 is a diagram illustrating conventional periodic CQI/CSI report procedure in FDD.

FIG. 8 is a diagram illustrating conventional periodic CQI/CSI report procedure in FDD.

Referring to FIG. 8, the CQI/CSI information is acquired based on the CSI-RS transmitted at the subframe 800 preceding four subframes before the subframe 805 for use in CQI report.

The non-periodic CQI/CSI report request is performed with DCI format 0 or 4 in the corresponding subframe 800. If a subframe for a specific purpose such as MBSFN matches the subframe carrying CSI-RS and thus the CSI-RS transmission is not transmitted, the CQI/CSI report is skipped.

In the case of reporting CQI/CSI in the subframe 805, the CQI/CSI report of the corresponding pattern is performed according to which CQI/CSI pattern is indicated by 1 in the preceding subframe 800 as the reference resource for CQI/CSI report. The measurement and report procedures are described afterward.

Figure 9:
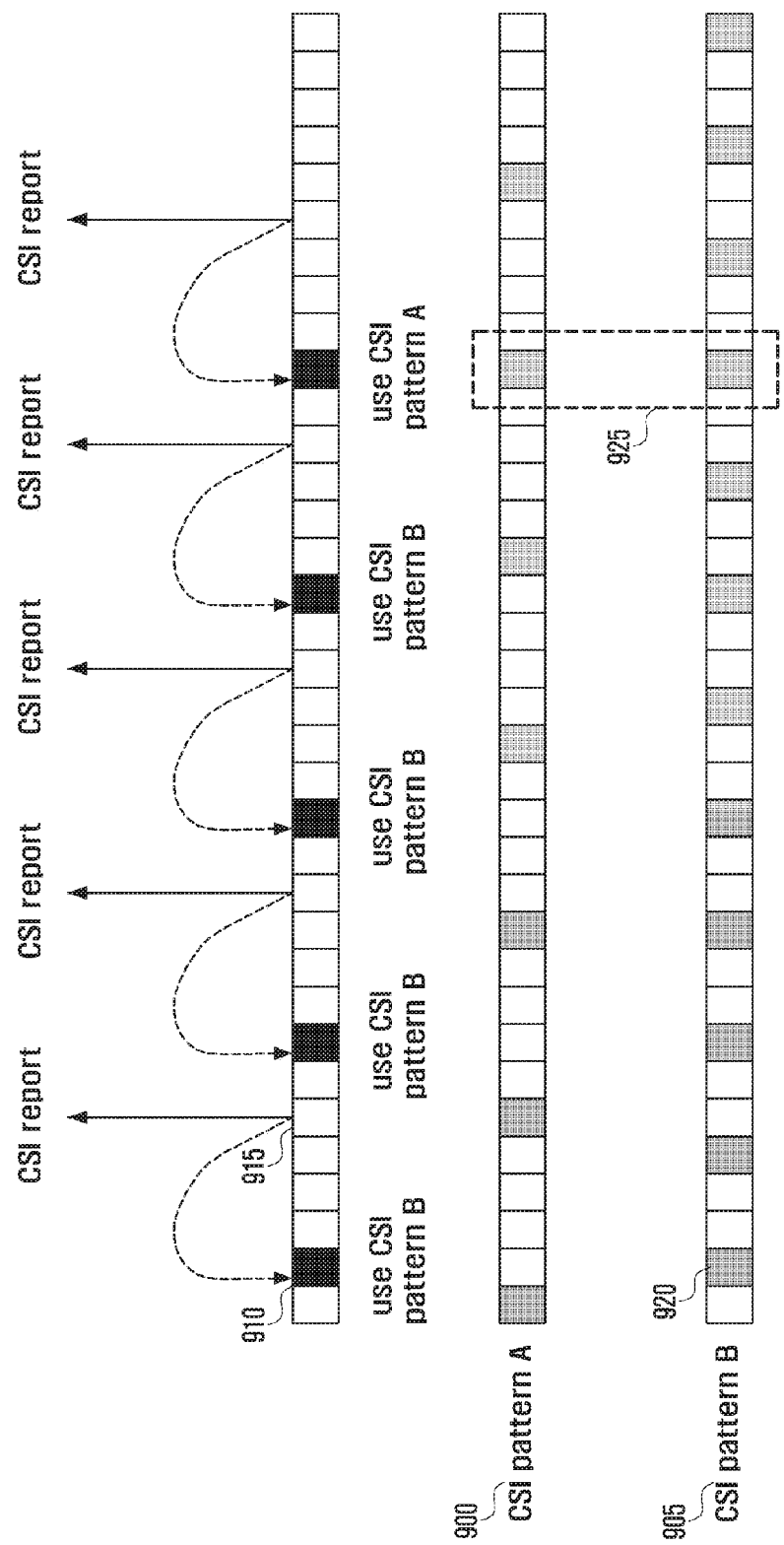
FIG. 9 is a pattern selection method using scheduling information of conventional CSI-RS.

FIG. 9 is a diagram illustrating a method for indicating which pattern is applied for the CQI/CSI report transmitted at a specific frame using the scheduling information of conventional CSI-RS (Reference Signal).

Referring to FIG. 9, the patterns for reporting CQI/CSI are classified into CSI pattern A 900 and CSI pattern B 905.

Each pattern indicates the subframes to be used for CQI/CSI measurement. If CQI/CSI report is performed at the subframe 915 the UE determines whether the subframe 910 considering CSI-RS matches the subframe indicated by one of the patterns.

The CSI pattern A 900 does not indicate the subframe matching the subframe carrying CSI-RS to be referenced. In contrast, the CSI-RS pattern B 905 indicates a subframe 920 matching the subframe carrying CSI-RS.

The CQI/CSI report in the subframe 915 in which CSI report is performed with the application of the pattern B as the second pattern.

The problem occurs when both the patterns indicate the subframe referencing the CSI-RS or there is no pattern indicating the corresponding subframe. In order to solve this problem, the pattern to be applied for CQI/CSI report carried in a specific subframe is indicated through explicit signaling with 1 bit.

The 1-bit indicator is set to 0 for indicating application of the first ABS pattern and 1 for indicating application of the second ABS pattern. According to an embodiment, the indication can be made with 2 bits to indicate the case of applying no pattern. The description of the indicator may vary depending on the pattern but not limited to the above description.

In another method, the pattern to be applied can be indicated implicitly. For example, if both the two patterns indicating the subframe referencing the CSI-RS, the CQI/CSI information may be reported with the application of the first or second ABS pattern unconditionally.

Figure 10:
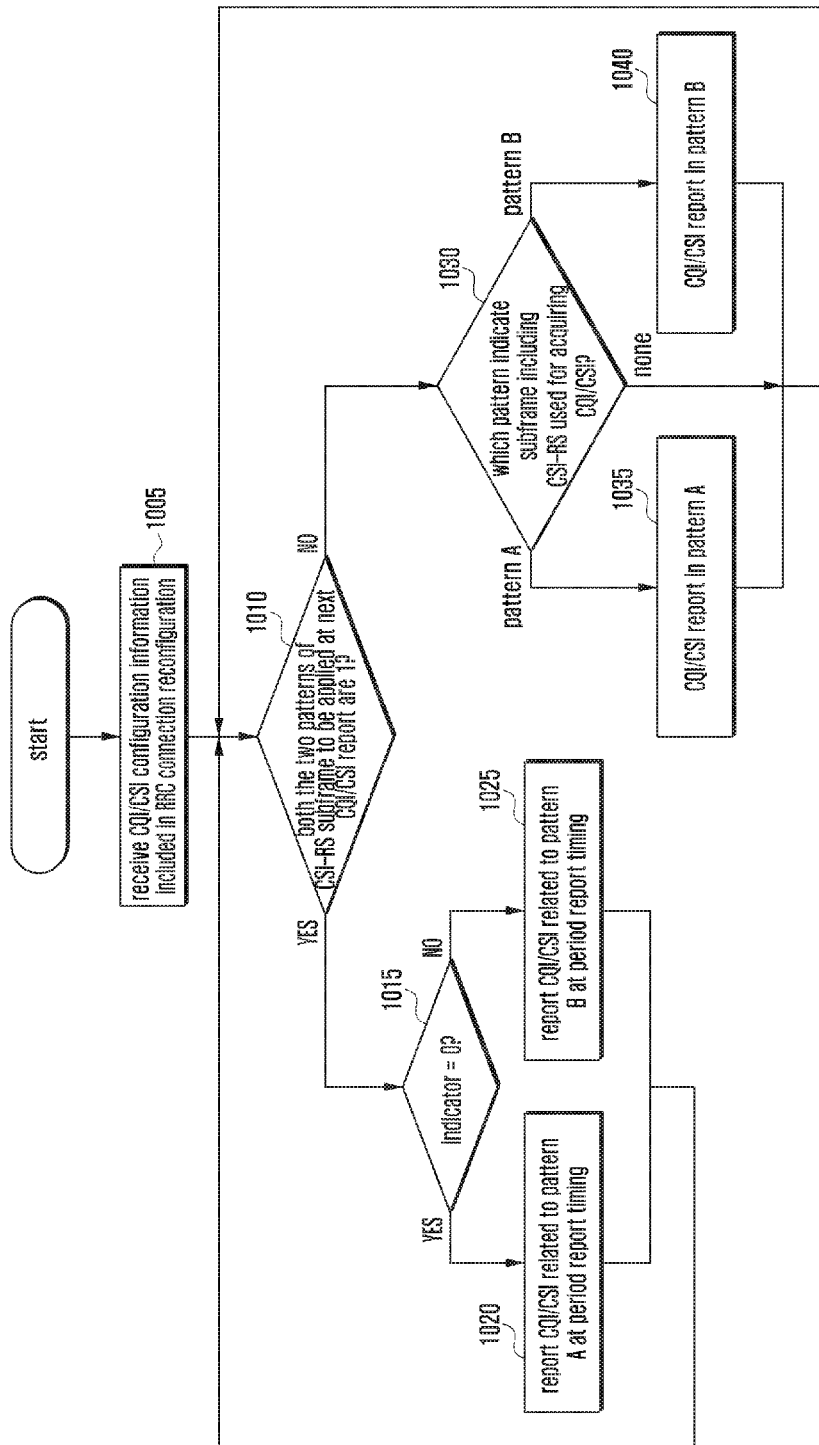
FIG. 10 is a flowchart illustrating UE operation according to embodiment 4.

FIG. 10 is a flowchart illustrating UE operation according to embodiment 4.

Referring to FIG. 10, the UE receives the CQI/CSI-RS configuration information included in RRC connection configuration at step 1005.

The UE checks whether both the two patterns are indicated by 1 for the CSI-RS subframe at the next CQI/CSI report timing at step 1010.

If both the two patterns are indicated by 1, the UE determines whether the 1-bit indicator pre-provided by the eNB is set to 0 or 1 at step 1015.

If the indicator is set to 0, the UE reports CQI/CSI information for the first pattern. In this embodiment, the first pattern is pattern A, and the second pattern is pattern B.

If the indicator is set to 1, the UE reports the CQI/CSI information for the second pattern.

If none of the two patterns is indicated by 1 at step 1010, the UE checks the pattern indicating the subframe carrying CSI-RS used for acquiring CQI/CSI at step 1030.

If the pattern indicating the subframe carrying CSI-RS used for acquiring CQI/CSI is the first pattern at step 1030, the UE reports the CQI/CSI information for the corresponding pattern at step 1035.

If the pattern indicating the subframe carrying CSI-RS used for acquiring CQI/CSI is the second pattern at step 1030, the UE reports the CQI/CSI information for the corresponding pattern at step 1040.

If there is no pattern indicating the subframe carrying CSI-RS used for acquiring CQI/CSI at step 1030, the corresponding CQI/CSI report timing is skipped such that the UE does not report any CQI/CSI information to the eNB.

Embodiment 5

In this embodiment, the CQI/CSI report pattern is hard-coded in the UE or the eNB signals a 'repetition factor'.

In the case of using the hard code configured in the UE, the UE perform CQI/CSI report according to the predetermined pattern.

That is, the order of patterns to be applied for CQI/CSI has been determined already, and the CQI/CSI information for the corresponding pattern is sent according to this order. In this embodiment, the first pattern is pattern A and the second pattern is pattern B.

For example, the patterns are hard-coded in the order of first patter, second pattern, first pattern, second pattern, and first pattern in the UE such that the CQI/CSI information is reported according to this order. Another method is to notify of the order by signaling 'repetition factor' to the UE.

For example, the signal including ENUMERATED {⅛, ¼, ½, 1, 2, 4, 8, spare1} can be transmitted as the repetition fact. Here, 1 indicates that the first and second patterns are applied alternately.

That is, the order of first pattern, second pattern, first pattern, second pattern, and first pattern is applied. 2 indicates that if the first pattern is applied twice, the second pattern is applied subsequently and this is repeated. That is, the order of first pattern, first pattern, second pattern, first pattern, first pattern, and second pattern is applied. ½ indicates that if the first pattern is applied once the second pattern is applied twice subsequently and this is repeated.

Such a series of patterns can be reset at every start time of SFN cycle, and other repetition factor can be executed in the same method as described above.

Figure 11:
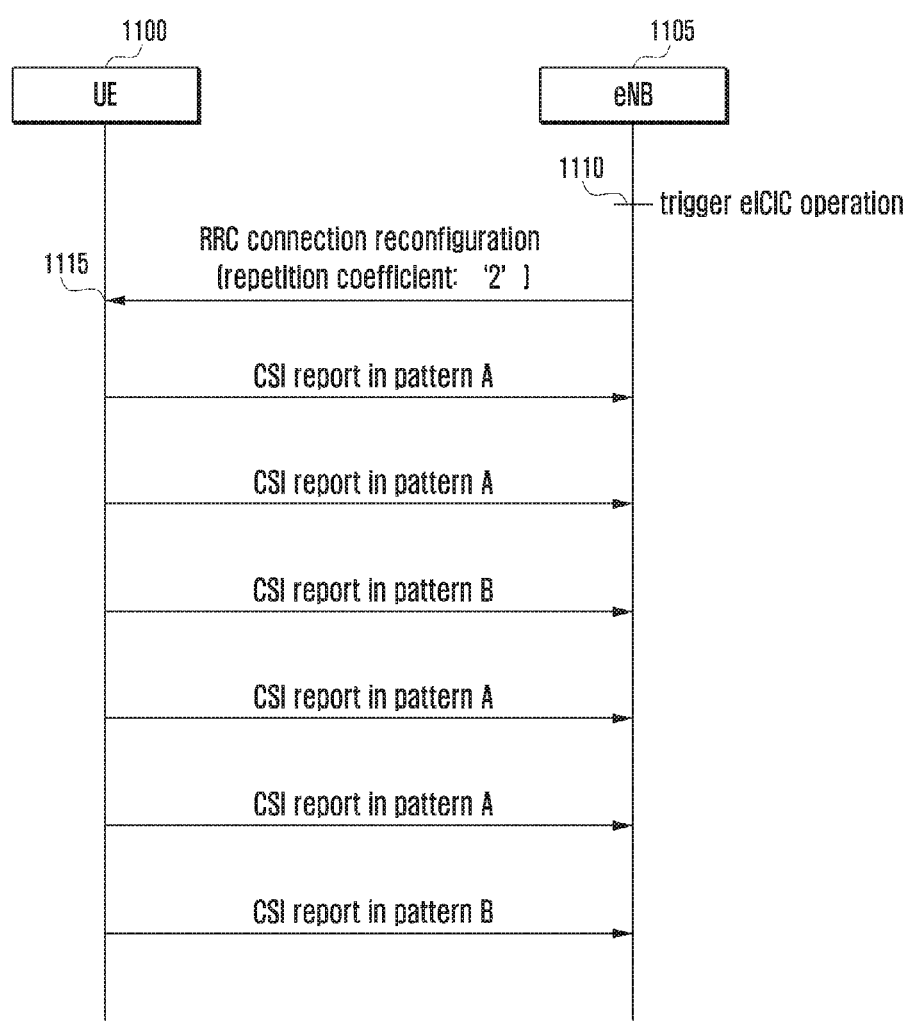
FIG. 11 is a signal flow diagram for describing embodiment 5.

FIG. 11 is a signal flow diagram for describing embodiment 5.

Referring to FIG. 11, the eNB 1105 triggers the eICIC operation at step 1110.

The eNB 1105 may indicates the order of the two patterns to be applied for CQI/CSI information report through RRC signaling at step 1115.

For example, if the repetition factor is 2, the UE sends the CQI/CSI report for pattern A twice and then the CQI/CSI report for pattern B once.

This is repeated until receiving RRC signaling again. Such a reporting pattern can be reset at every start time of SFN cycle.

Figure 12:
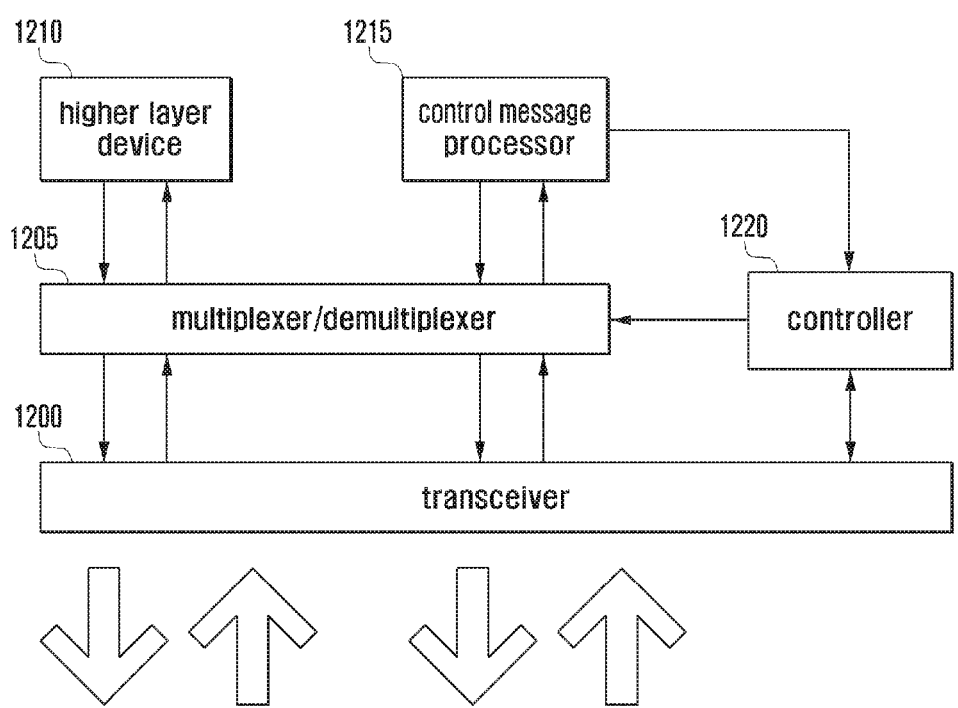
FIG. 12 is a block diagram illustrating internal structure of the UE according to the present invention.

FIG. 12 is a block diagram illustrating internal structure of the UE according to the present invention.

Referring to FIG. 12, the UE communicates data with higher layer 1210 and transmits/receives control message through a control message processor 1215.

When transmitting control signals or data to the eNB, the UE multiplexes the control signals or data by means of the multiplexer/demultiplexer 1205 and transmits the data through the transceiver 1200 under the control of the controller 1220.

In contrast, if a signal is received by the transceiver, the UE receives the physical signal by means of the transceiver 1200 under the control of the controller 1220. The received signal is demultiplexed by the multiplexer/demultiplexer 1205 and then transferred to the higher layer device 1210 or the control message processor 1215 according to the respective message informations.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method by a terminal, the method comprising:
receiving at least two subframe sets for measuring channel state and information on a radio resource control (RRC) signaling, the information indicating for which subframe set a channel state information (CSI) report is triggered;
receiving downlink control information (DCI) for triggering the CSI report;
identifying a subframe set of the at least two subframe sets based on the DCI for triggering the CSI report; and
transmitting channel state information in a second subframe, the channel state information being measured in a first subframe determined based on the second subframe and the identified subframe set.

2. The method of claim 1, wherein the downlink control information includes bit information for triggering the CSI report.

3. The method of claim 1, wherein an interval between the first subframe and the second subframe is a smallest value greater than or equal to 4, and
wherein the first subframe is included in the identified subframe set.

4. The method of claim 1,
wherein the DCI is received in a third subframe,
wherein an interval between the third subframe and the second subframe is 4, and
wherein the subframe set is identified based on the DCI for triggering the CSI report and the information.

5. A method by a base station, the method comprising:
transmitting at least two subframe sets for measuring channel state and information on a radio resource control (RRC) signaling, the information indicating for which subframe set a channel state information (CSI) report is triggered;
transmitting downlink control information (DCI) for triggering the CSI report; and
receiving channel state information in a third subframe, the channel state information being measured in a first subframe determined based on the second subframe and a subframe set, and
wherein the subframe set is identified of the at least two subframe sets based on the DCI for triggering the CSI report.

6. The method of claim 5, wherein the downlink control information includes bit information for triggering the CSI report.

7. The method of claim 6, wherein an interval between the first subframe and the second subframe is a smallest value greater than or equal to 4, and
wherein the first subframe is included in the identified subframe set.

8. The method of claim 6,
wherein the DCI is transmitted in a third subframe,
wherein an interval between the third subframe and second subframe is 4, and
wherein the subframe set is identified based on the DCI for triggering the CSI report and the information.

9. A terminal for measuring channel state in a wireless communication system, the terminal comprising:

a transceiver; and a controller coupled with the transceiver and configured to:
  receive at least two subframe sets for measuring channel state and information on a radio resource control (RRC) signaling, the information indicating for which subframe set a channel state information (CSI) report is triggered,
  receive downlink control information (DCI) for triggering the CSI report,
  identify a subframe set of the at least two subframe sets based on the DCI for triggering the CSI report, and
  transmit channel state information in a second subframe, the channel state information being measured in a first subframe determined based on the second subframe and the identified subframe set.

10. The terminal of claim 9, wherein the downlink control information includes bit information for triggering the CSI report.

11. The terminal of claim 9, wherein an interval between the first subframe and the second subframe is a smallest value greater than or equal to 4, and
  wherein the first subframe is included in the identified subframe set.

12. The terminal of claim 9,
  wherein the DCI is received in a third subframe,
  wherein an interval between the first third subframe and the second subframe is 4, and
  wherein the subframe set is identified based on the DCI for triggering the CSI report and the information.

13. A base station for measuring channel state in a wireless communication system, the base station comprising:

a transceiver; and a controller coupled with the transceiver and configured to:
  transmit at least two subframe sets for measuring channel state and information on a radio resource control (RRC) signaling, the information indicating for which subframe set a channel state information (CSI) report is triggered,
  transmit downlink control information (DCI) for triggering the CSI report, and
  receive channel state information in a third subframe, the channel state information being measured in a first subframe determined based on the second subframe and a subframe set, and
  wherein the subframe set is identified of the at least two subframe sets based on the DCI for triggering the CSI report.

14. The base station of claim 13, wherein the downlink control information includes bit information for triggering the CSI report.

15. The base station of claim 13, wherein an interval between the first subframe and the second subframe is a smallest value greater than or equal to 4, and
  wherein the first subframe is included in the identified subframe set.

16. The base station of claim 13,
  wherein the DCI is transmitted in a third subframe,
  wherein an interval between the third subframe and the second subframe is 4, and
  wherein the subframe set is identified based on the DCI for triggering the CSI report and the information.

* * * * *